United States Patent
Kesireddy

(10) Patent No.: US 8,499,196 B2
(45) Date of Patent: Jul. 30, 2013

(54) APPLICATION PORTAL TESTING

(75) Inventor: Manohar Kesireddy, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/368,393

(22) Filed: Feb. 8, 2012

(65) Prior Publication Data
US 2012/0137177 A1    May 31, 2012

Related U.S. Application Data

(63) Continuation of application No. 12/610,879, filed on Dec. 2, 2009, now Pat. No. 8,140,904.

(51) Int. Cl.
*G06F 11/00* (2006.01)

(52) U.S. Cl.
USPC ............................. 714/33; 714/38.1; 714/48

(58) Field of Classification Search
USPC .......................................... 714/38.1, 48, 33
See application file for complete search history.

(56) References Cited

U.S. PATENT DOCUMENTS

| | | | |
|---|---|---|---|
| 5,978,940 A | 11/1999 | Newman et al. | |
| 5,983,001 A | 11/1999 | Boughner et al. | |
| 5,987,633 A | 11/1999 | Newman et al. | |
| 7,590,542 B2 | 9/2009 | Williams et al. | |
| 2003/0212561 A1 | 11/2003 | Williams et al. | |
| 2006/0230410 A1 | 10/2006 | Kurganov et al. | |
| 2007/0174711 A1 | 7/2007 | Uehara et al. | |

*Primary Examiner* — Charles Ehne

(57) ABSTRACT

A first test script that includes at least one first step for executing a test of a test portal is provided in a computing device. An indication that an event has occurred in response to the test is received in the computing device. A second test script that includes at least one second step for executing the test is generated in the computing device, the at least one second step being at least in part a response to the event.

21 Claims, 2 Drawing Sheets

APPLICATION PORTAL TESTING

CROSS REFERENCE TO RELATED APPLICATIONS

The present application is a continuation of U.S. patent application Ser. No. 12/610,879, filed on Nov. 2, 2009, which is hereby incorporated by reference in its entirety.

BACKGROUND INFORMATION

Present mechanisms for testing an application portal, such as a voice portal, may be cumbersome. For example, a test process could require a test engineer to create manually, e.g., in a word processing document, spreadsheet, etc., a test script 145. The test engineer may then be required to carry out some or all of the test script 145. For example, in the case of testing an interactive voice response (IVR) application, a test engineer may be required to dial a telephone number associated with the test application, listen to prompts provided by the application, make voice and/or touch-tone responses as appropriate, and then record results. Thus, present mechanisms for testing an application portal may be time-consuming, resource intensive, inefficient, and prone to error.

DETAILED DESCRIPTION OF PREFERRED EMBODIMENTS

Figure 1:
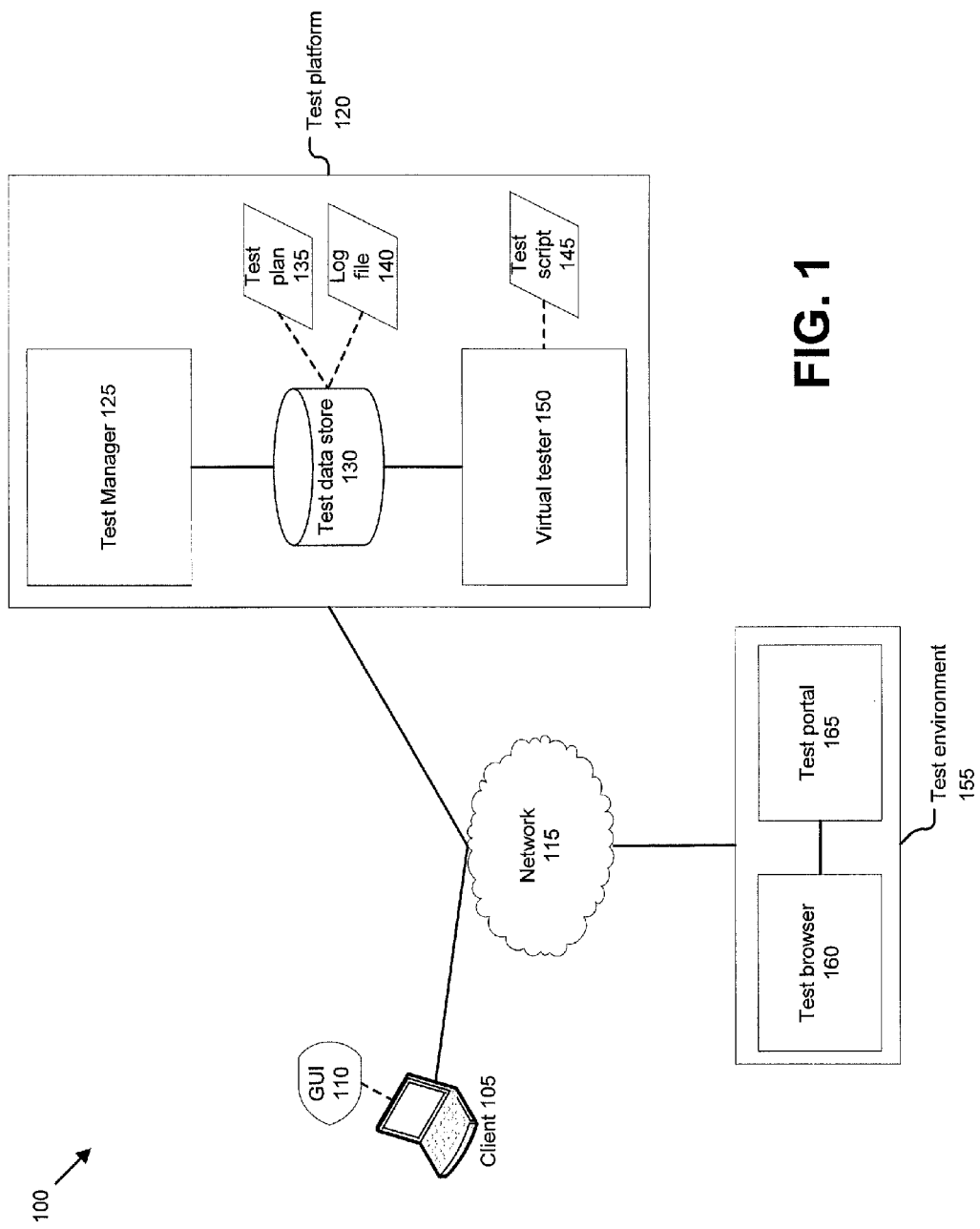
FIG. 1 illustrates an exemplary system for testing an application portal.

FIG. 1 illustrates an exemplary system 100 for testing an application portal. A client device 105 may be provided with a graphical user interface (GUI) 110. The client device 105 may communicate with a test platform 120 through a network 115. The test platform 120 generally includes a test manager 125 that may provide the GUI 110 to client 105. Further, the test manager 125 may receive input from client device 105 via the GUI 110. The test platform 120 further generally includes a test data store 130, and a virtual tester 150. The test data store 130 may include data related to application portal testing, including one or more test plans 135, and one or more test log files 140. Virtual tester 150 interacts with a test environment 155, e.g., by generating a test script 145 according to information provided in a test plan 135 and/or a log file 140. The test environment 155 may include a test browser 160 for interacting with a test portal 165.

Client device 105 may be any computing device capable of communicating via network 115, and providing GUI 110. Client device 105 is typically a general-purpose computing device, such as a laptop computer, desktop computer, handheld computer, etc. GUI 110 is generally a webpage or the like provided in a web browser that is stored and that executes on client 105.

Network 115 is generally a packet network, and may provide communications according to the known internet protocol (IP). As such, network 115 may use known protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. As is known, network 115 may be used to transport a variety of data, including multimedia data such as audio and video.

Test platform 120 may include various elements including those identified above. In general, test platform 120 includes mechanisms for storing and executing test plans 135 such as test manager 125, test data store 130, and virtual tester 150, and also includes results of executing test plans 135, e.g., log files 140. Various components within test platform 120, such as test manager 125, test data store 130, and virtual tester 150, may communicate with each other via various known mechanisms, such as a local area network (LAN) or the like, including possibly network 115.

Test manager 125, included in test platform 120, may include one or more computing devices including therein one or more computer readable media that include instructions executable by one or more processors therein for providing various operations, including those discussed herein with respect to test manager 125. For example, test manager 125 may be provided with a web server or a like application for providing Web pages or the like for display as GUI 110 in a browser executing on client 105. Further, test manager 125 may be provided with instructions for receiving inputs from client 105 according to mechanisms provided in GUI 110, and for storing data based on such inputs in test data store 130, e.g., as one or more test plans 135. Test manager 125 may further include mechanisms for causing one or more test plans 135 to be executed, and/or for reading, and generating reports from, one or more log files 140.

Data store 130 may include one or more test plans 135 and/or one or more log files 140. A test plan 135 includes a set of steps for performing a test of test portal 165. Some or all of such steps may be specified by providing inputs through a form or the like included in GUI 110. Steps for a test plan 130 may be stored in data store 130 in a file, in a relational table, etc. Table 1 lists exemplary steps that could be included in a test plan 135.

TABLE 1

| Speaker | Event Description | Event Value | Module |
|---|---|---|---|
| Portal | To continue in English, say "English" | Dialog3.ulaw | Language Selector |
| Virtual tester | "English" | English.wav | Language Selector |
| Portal | For billing press 1, to order services or television programming packages, press 2. For everything else press 3. | Dialog6.ulaw | Confirm Call Purpose |
| Virtual tester | DTMF 3 | DTMF3.wav | Confirm Call Purpose |

The "Speaker" column in Table 1 identifies whether a virtual tester 150, or test portal 165, is expected to provide input, e.g., a response to an event. The "Event Description" column describes events that may occur during a test. The "Event Value" column provides names of files associated with events. For example, when the virtual tester 150 is expected to say "English," that audio input is provided in a waveform audio formats (WAV) file "English.way." Input and/or responses from portal 165 may be provided in formats known for voice telephony, such as the "µ-law" format indicated by the "ulaw" file extension and governed by ITU-T standard G.711, also known as CCITT G.711. "ITU-T" stands for the Telecommunication Standardization Sector of the International Telegraphic Union. This organization was previously known as "CCITT." A "Module" in a test plan 130 simply refers to a grouping of events or test steps.

A log file 140 includes a record of events that occurred during a test. For example, a test portal 165 may generate entries for a log file 140 as a test is being conducted.

Virtual tester 150, included in test platform 120, may include one or more computing devices including therein one or more computer readable media that include instructions executable by one or more processors therein for providing various operations, including those discussed herein with respect to virtual tester 150. Virtual tester 150 may include instructions incorporating various rules for creating a test script 145 from a test plan 135 and/or a log file 140. For example, virtual tester 150 may generate a test script 145 such as Voice eXtensible Markup Language (VXML) file, and further may provide this file to a test browser 160 for conducting a test of a test portal 165. The test script 145 may be generated at least in part by parsing the test plan 135 to determine what test steps to include in the test script 145, e.g., the VXML file. Moreover, during the course of a test, virtual tester 150 may generate multiple VXML files for the test based at least in part on real-time or near real-time review of a log file 140, e.g., as entries are added to the log file 140 based on entries generated by test portal 165. Further, virtual tester 150 may use the log file 140 to generate one or more reports concerning a test or tests of the portal 165.

As mentioned above, test environment 155 generally includes a test browser 160 and a test portal 165. Test browser 160 may include one or more computing devices including therein one or more computer readable media that include instructions executable by one or more processors therein for providing various operations, including those discussed herein with respect to test browser 160. In an exemplary implementation, test browser 160 includes instructions for interpreting VXML files, and for sending requests to test portal 165 according to hypertext transfer protocol (HTTP) according to commands included in a VXML file.

Test portal 165 hosts an application to be tested. For example, the application may be an interactive voice response (IVR) system. As such, test portal 165 may include one or more computing devices including therein one or more computer readable media that include instructions executable by one or more processors therein for providing various operations, including those discussed herein with respect to test portal 165. As is known, an IVR system provides voice prompts to a caller, and allows the caller to provide responses that may determine what further voice prompts or information are provided. Callers may provide responses in various forms, e.g., by voice or by dual-tone multi-frequency (DTMF) inputs.

Test browser 160 and 165 may communicate with one another via a local area network (LAN), and network 115, or some other network. Further, test browser 160 and test portal 165 may communicate with test platform 120 via network 115.

Computing devices such as those discussed herein generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Figure 2:
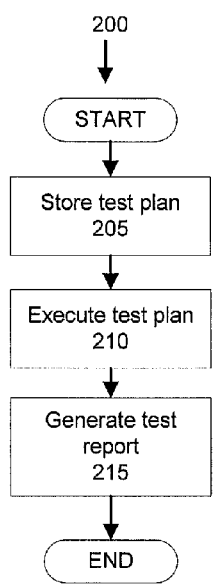
FIG. 2 illustrates an exemplary process for use of a test plan.

FIG. 2 illustrates an exemplary process 200 for use of a test plan 135.

Process 200 begins in a step 205, in which a test plan 135 is stored in data store 130, e.g., by test manager 125. For example, as discussed above, a user of client 105, e.g., using GUI 110, may specify steps for a test plan 135. GUI 110 could provide a hypertext markup language (HTML) form or the like for specifying steps for the test plan 135. Further, GUI 110 could provide mechanisms for specifying an order for the steps, for associating audio or other files with steps, for grouping steps into modules (sometimes also referred to as nodes), etc. Exemplary steps for a portion of a test plan 135 were provided above in Table 1.

Next, in step 210, the test plan 135 is executed. Generally, virtual tester 150 initiates the execution of a test plan 135, e.g., according to an automated scheduler, according to a manually initiated trigger, or according to some other trigger, such as might be stored and provided from data store 130. Virtual tester 150 may use the test plan 135 to create a first test script 145, e.g., a VXML file, to provide to test browser 160. The test browser 160 in turn runs the test script 145, e.g. by interpreting interprets the VXML file, and submits requests as appropriate, e.g., via HTTP, to test portal 165. The test portal 165, in turn reports events to virtual tester 150. Based on events reported by test portal 165 during testing, the virtual tester 150 generates a second test script 145, e.g., an additional VXML file to be provided to test browser 160 for the test.

Moreover, to complete a test, additional test script 145s, i.e., third, fourth, fifth test script 145s, etc., may be provided in a similar manner according to events reported by test portal 165. Further details relating to the execution of a test plan 135 are discussed below with respect to FIG. 3.

Next, in step 215, once the test executed as described above with respect to step 210 is complete, virtual tester 150 may generate a report concerning the test. The report may be based on events logged by test portal 165. For example, a report could include a list of events, e.g., according to event identifiers and/or descriptions that were logged, along with a status of each event. Event descriptions could include listing files that were used to generate the event, e.g., "English.way." Possible event statuses include indicators such as "ignored," meaning that the event was ignored because it was not included in the test script 145, "completed," meaning that the event was included in a test script 145 and was successfully completed, or "failed," meaning that the event was included in a test script 145 but was not successfully completed.

Following step 215, process 200 ends.

Figure 3:
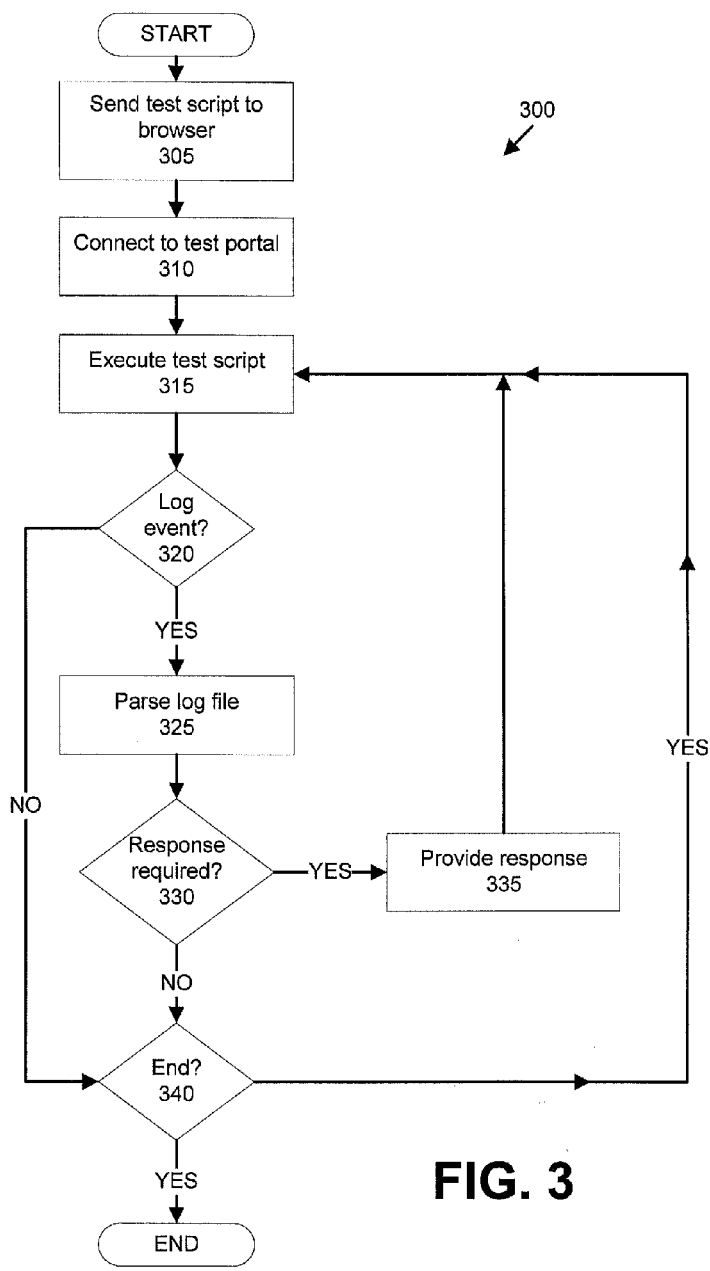
FIG. 3 illustrates an exemplary process for executing a test plan.

FIG. 3 illustrates an exemplary process 300 for executing a test plan 135.

Process 300 begins in a step 305, in which virtual tester 150 sends a test script 145 such as a VXML file to test browser 160. As mentioned above, virtual tester 150 may generate the test script 145 according to a test plan 135. For example, the test script 145 may be configured to cause the execution of steps included in the test plan 135.

Next, in step 310, test browser 160, generally according to the test script 145, connects to the test portal 165. For example, if the portal 165 provides an IVR application that is being tested, test browser 160 may use a 10 digit telephone number to place a telephony call to the test portal 165. Once the connection is made, e.g., the call is connected, process 300 proceeds to step 315.

Step 315 may follow either step 310 or step 335. In step 315, test browser 160 executes commands in the test script 145 supplied either as described above with respect to step 310, or as described below with respect to step 335, e.g., interprets a VXML file and makes requests via HTTP to test portal 165, which in turn executes steps as appropriate to respond to such requests.

In step 320, virtual tester 150 determines whether an event has been logged or reported by test portal 165. For example, virtual tester 150 may monitor a log file 140 as it is being created. For example, when testing an IVR application, events reported by test portal 165 could include a DTMF input to the test portal 165, a voice input to the test portal 165, the test portal 165 providing some audio output, the test portal 165 pausing, etc. If no event has been logged, e.g., because a predetermined timeout period has elapsed, process 300 proceeds to step 335. However, if an event has been logged, step 320 is executed next.

In step 325, virtual tester 150 parses the log file 140 provided by test portal 165 as a prerequisite to determining whether the events logged in step 315 requires any response by virtual tester 150. For example, the following string could be provided in a log file 140: "2009-07-28/11: 06:33.999 METRIC 006E00A6-1001E46F prompt/usr/local/ phoneweb/tmp/006E00A6-1001E46F-0001//promptsfile. 006E00A6-1001E46F-0001.1:audio|http://113.128.134. 106:30001/fsccustprompts/customer/app/pause750.ulaw; audio|http://113.128.134.106:30001/fsccustprompts/customer/app/promptl.ulaw." Virtual tester 150 could parse the string to determine that the portal 165 had played the files "pause750.ulaw" and "promptl.ulaw." By identifying that these files had been played, virtual tester 150 could determine that test portal 165 is awaiting input. Further, another log 140 entry could include the string "2009-07-28/11:06:33.999 METRIC 006E00A6-1001E46F promptend done." Parsing the string for the phrase "promptend done" could provide further indication that test portal 165 is awaiting input.

In step 330, virtual tester 150 determines whether a response to the event detected in step 315 is required. For example, if test portal 165 has merely executed a pause before playing an audio file, or is performing some other step that requires no response, or the event is that test portal 165 has received some input to which it must respond, then a response may not be required from virtual tester 150. If a response is required, step 335 is executed next. Otherwise, step 340 is executed next.

In step 335, virtual tester 150 generates, and provides to test browser 160, a test script 145, e.g., a VXML file, including a response to the events identified in step 315. For example, continuing the example provided above with respect to step 320, if the detected event included portal 165 playing a file that contains a prompt for some user action, e.g., "speak your telephone number," "press 1 for billing questions, press 2 for technical support, press 3 to schedule an appointment," etc., then the generated test script 145 will include instructions for test browser 160 to cause an appropriate response, e.g., playing an audio file reciting a telephone number, playing an audio file representing a DTMF tone, etc.

In step 340, virtual tester 150 determines whether the test process 300 should be terminated. In some cases, e.g., when step 340 immediately follow step 320, virtual tester 150 may check to determine if a predetermined period of time has elapsed without any events being reported, and may determine, if so, that the process 300 should be terminated. In other cases, e.g., when step 340 immediately follow step 330, virtual tester 150 may determine that no events remain to be executed in the test process 300. For example, virtual tester 150 could compare the last event identified in step 325 to the last event included in the applicable test plan 135 to determine that all events in the test plan 135 have been executed. If virtual tester 150 determines that process 300 should not be terminated, then the process 300 returns to step 315 for the test script 145 currently provided to test browser 160 to continue execution. Otherwise, process 300 ends following step 340.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, at a computing device, a first test script that includes at least one first step for executing a test of a test portal, the first test script being established by a test plan stored in a data store;
   providing an indication that an event has occurred in response to the test, the event being logged in a log file; and
   receiving a second test script, the second test script based at least in part on the log file and test plan and including at least one second step for executing the test, the at least one second step being at least in part a response to the event.

2. The method of claim 1, wherein at least one of the first script and the second script include a request to play an audio file.

3. The method of claim 1, wherein the first script and the second script include Voice extensible Markup Language.

4. The method of claim 1, further comprising initiating the at least one first step of the first test script in response to receiving the first test script.

5. The method of claim 1, further comprising:
   providing an indication that a second event has occurred in response to the test, the second event being logged in the log file; and
   receiving a third test script based at least in part on the log file and the test plan and including at least one third step for executing the test, the at least one third script being at least in part a response to the second event.

6. The method of claim 1, wherein at least the second test script is generated upon at least a near real-time review of the log file.

7. The method of claim 1, wherein the indication is provided by a test browser and the event is logged in the log file at a virtual tester separate from the test browser.

8. A system, comprising:
   a computing device configured to:
      receive a first test script from a test plan stored in a data store, the first test script including at least one first step for executing a test of a test portal;
      provide an indication that an event has occurred in response to the test, the event being logged in a log file;
      receive a second test script based at least in part on the log file and the test plan, the second test script including at least one second step for executing the test, the at least one second step being at least in part a response to the event.

9. The system of claim 8, wherein at least one of the first script and the second script include a request to play an audio file.

10. The system of claim 8, wherein the first script and the second script include Voice extensible Markup Language.

11. The system of claim 8, the computing device further configured to initiate the at least one first step of the first test script in response to receiving the first test script.

12. The system of claim 8, the computing device further configured to:
    provide an indication that a second event has occurred in response to the test, the second event being logged in the log file; and
    receive a third test script based at least in part on the log file and the test plan, the third test script including at least one third step for executing the test, the at least one third script being at least in part a response to the second event.

13. The system of claim 8, wherein at least the second test script is generated upon at least a near real-time review of the log file.

14. The system of claim 8, wherein the indication is provided by a test browser and the event is logged in the log file at a virtual tester separate from the test browser.

15. The system of claim 8, wherein the indication is provided by a test browser and the event is logged in the log file at a virtual tester separate from the test browser.

16. A non-transitory computer-readable medium that stores computer-readable instructions, the instructions being executable by a processor and including instructions for:
    receiving, in a computing device, a first test script that includes at least one first step for executing a test of a test portal;
    providing an indication that an event has occurred in response to the test, the event being logged in a log file; and
    receiving a second test script based at least in part on the log file and the test plan, the second test script including at least one second step for executing the test, the at least one second step being at least in part a response to the event.

17. The medium of claim 16, wherein at least one of the first script and the second script include a request to play an audio file.

18. The medium of claim 16, wherein the first script and the second script include Voice extensible Markup Language.

19. The medium of claim 16, the instructions further comprising instructions for initiating the at least one first step of the first test script in response to receiving the first test script.

20. The medium of claim 16, the instructions further comprising instructions for:
    providing an indication that a second event has occurred in response to the test, the second event being logged in the log file; and
    receiving a third test script based at least in part on the log file and the test plan, the third test script including at least one third step for executing the test, the at least one third script being at least in part a response to the second event.

21. The medium of claim 16, wherein at least the second test script is generated upon at least a near real-time review of the log file.

* * * * *